April 30, 1946.                M. W. BOWEN ET AL                2,399,319
                    WASHING MACHINE TRANSMISSION AND SUPPORT
                    Filed May 11, 1944            5 Sheets-Sheet 3

INVENTORS.
MYRON W. BOWEN,
EVERETT R. BURTNETT.
BY
M. W. Green.
ATTORNEY.

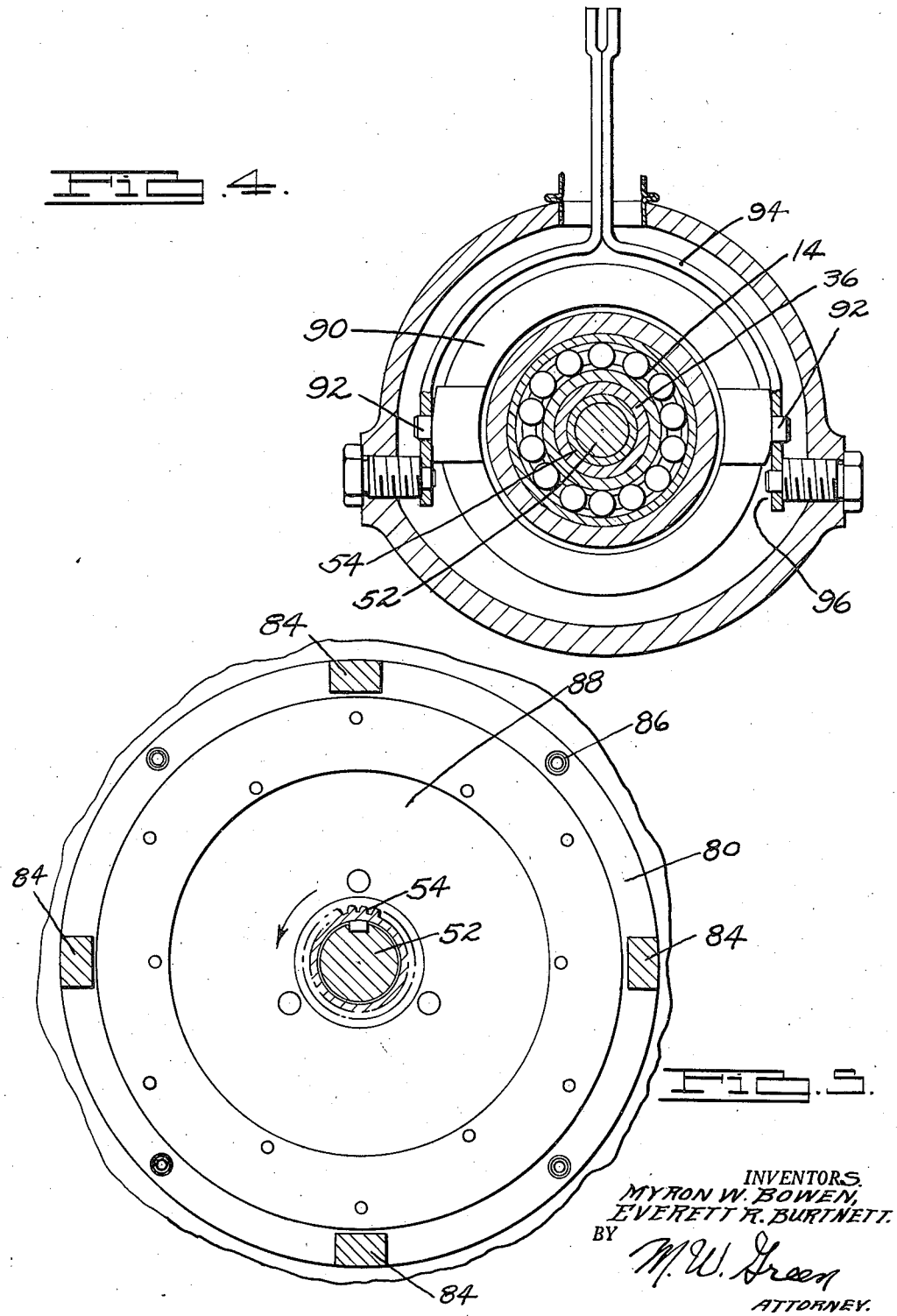

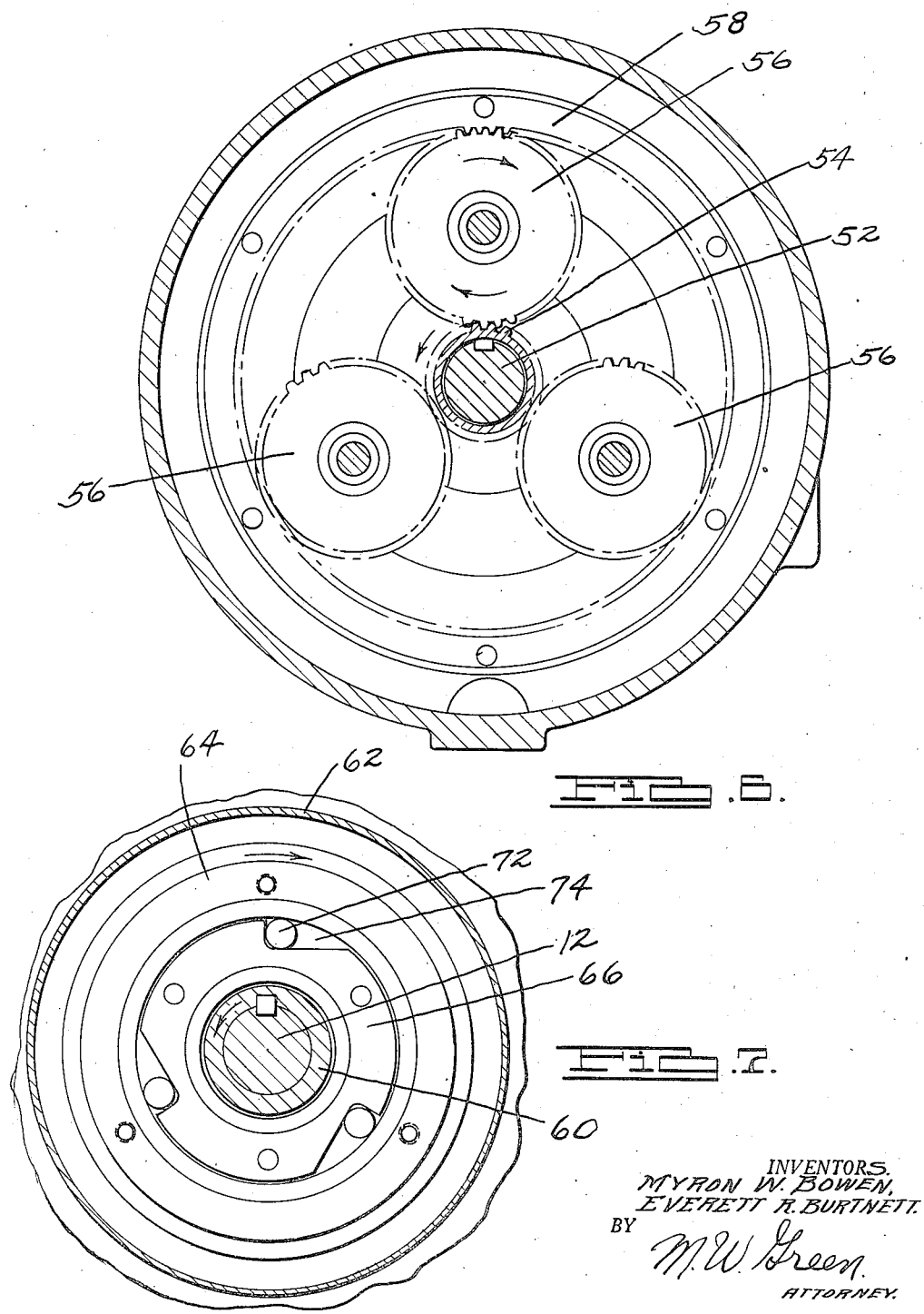

Patented Apr. 30, 1946

2,399,319

UNITED STATES PATENT OFFICE 2,399,319

WASHING MACHINE TRANSMISSION AND SUPPORT

Myron W. Bowen, Niles, Mich., and Everett R. Burtnett, Chicago, Ill., assignors to Bendix Home Appliances, Inc., South Bend, Ind., a corporation of Delaware Application May 11, 1944, Serial No. 535,150

5 Claims. (Cl. 74—291)

This invention relates to a washing machine transmission and support assembly, the mechanism used for illustration being designed to support and rotate a clothes containing cylinder or rotor of a washing machine used both as a container for washing and for centrifuging to remove water.

In so-called automatic washing machines which are designed to both wash and remove the water from the clothes, it is necessary to provide means to obtain at least two speeds of operation of the container for the clothes, one speed for washing and another higher speed for centrifuging. In the type of machine which rotates continuously in one direction it is usual practice to provide a gearing for the lower speed of operation and by some shifting or clutch means to cause that gearing to be put in operation or to drive directly without the gearing. In addition to this purely transmission feature of the required device, it is also necessary in the type of washing machine here under consideration to design the output shaft of the transmission and the support for such shaft together with the transmission mechanism in such a manner that it will satisfactorily support the cylinder or rotor for rotation on the end of said shaft while leaving the opposite end of the rotor unsupported and open.

The unit under consideration therefore has for its primary object to perform two functions; namely, that of a two-speed transmission combined with that of a satisfactory cantilever support of a load which is continuously rotated from the transmission.

It is a further object to provide a clutch for actuation of a transmission positioned between two spaced bearings of a shaft adapted to act as a cantilever support for a load, said clutch having sliding parts held from relative rotation by contact with portions of a gear forming part of said transmission.

It is another object to provide a transmission with a planetary gear train operable between two spaced bearings of a main load supporting shaft with supporting means and arrangement for a one-way connection for operation therewith and further to provide a clutch for cooperative action with said planetary gear train and said one-way connection.

It is a further object to provide a clutch for operation between two spaced bearings of a transmission employing a sleeve for connecting an outside drive pulley with said transmission gear train, said clutch parts being supported on and cooperatively operating with said sleeve.

The above and other objects of the invention will appear more fully from the following more detailed description and by reference to the accompanying drawings forming a part hereof and wherein:

Figure 4 is a section on the line 4—4 of Figure 1 and shows the lever mechanism for operation of the clutch together with the section through one of the main bearings.

Figure 5 is a section on the line 5—5 of Figure 1 and shows the construction of the clutch mechanism particularly the interior thereof and its relation to adjacent parts.

Figure 6 is a view on the line 6—6 of Figure 1 and shows the relation of the planetary gears and adjacent parts.

Figure 7 is a section on the line 7—7 of Figure 1 and shows the one-way drive connection.

Figure 1:
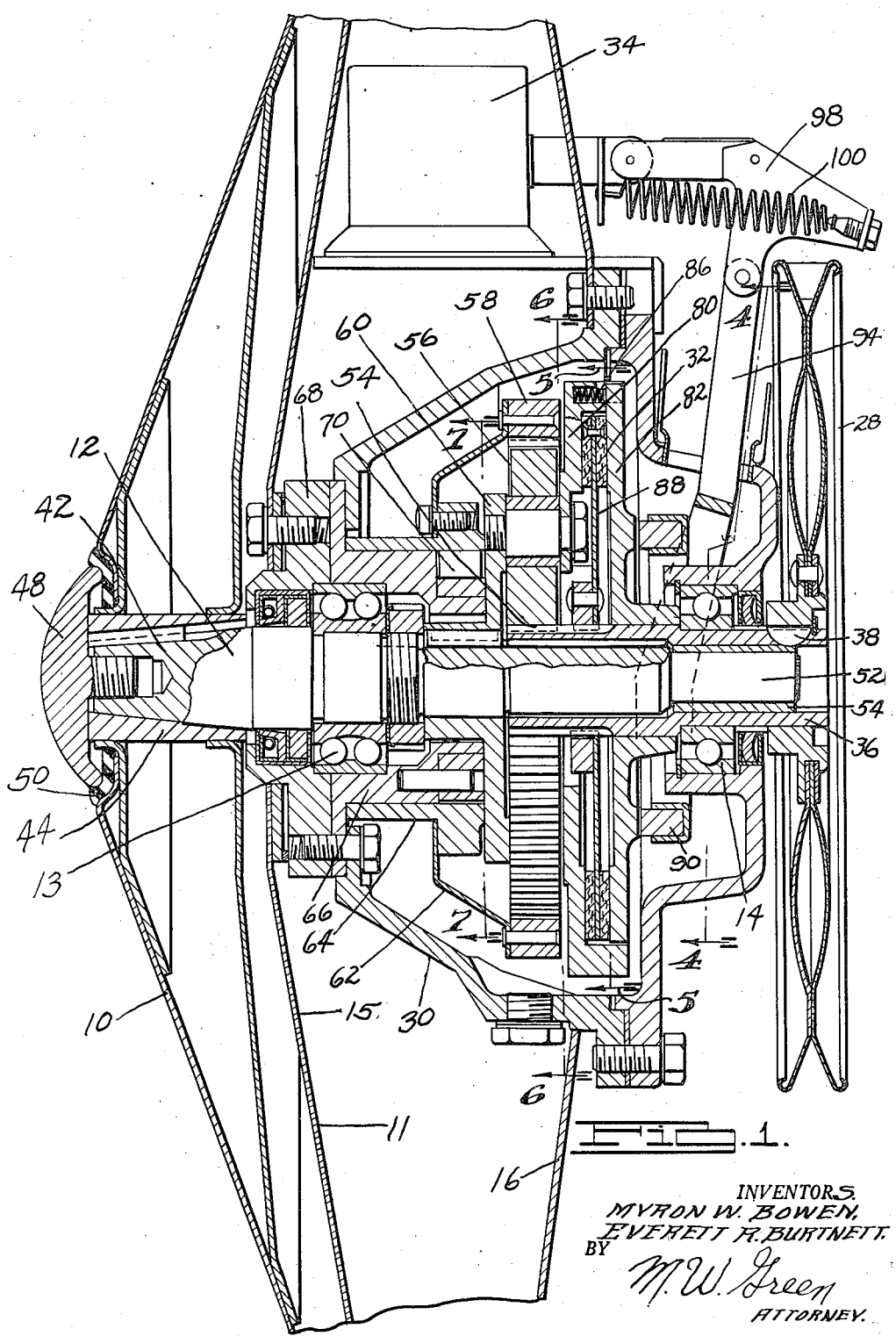
Figure 1 is a cross-sectional view through the transmission and support assembly showing a portion of the end of the tub and the supported rotor.

Referring to the drawings in which like reference characters refer to the same parts through the several figures of the drawings, a washing machine rotor 10 designed to carry and rotate clothes to be washed and dried by centrifuging is mounted in supporting portion of a tube 11. For the purpose of supporting the rotor 10, there is provided a shaft 12 which in the type of horizontal cylinder or rotor washing machine illustrated is provided with an inner bearing 13 on a wall 15 of the tub and is indirectly supported at its outer end in bearing 14. For the purpose of providing spaced walls in the tub to support the inner and outer bearings, the inner wall of the tub is preferably formed in the shape of a cone such as the member 15 while the outer member or wall may be formed in a cone shape also but oppositely positioned. The outer cone member may be a complete cone but preferably is made up of individual braces or spider members 16 in the plane of a cone as shown. The two spaced conical walls have their edges secured together at the outside of the tub and the assembly is called a "cone-back" and the central opening in this cone-back member corresponds to the axis of the tub. In previous installations employing a transmission which was mounted in other positions than in the cone-back, bearings were also required to support the rotor shaft at the positions 13 or 14. However when, as in the installation herein disclosed, a transmission is placed between the two bearings 13 and 14, it then becomes possible to use the bearings for a dual purpose and the number of bearings required is reduced for a complete machine. It is therefore possible to construct without additional total expense a much stronger and more efficient unit for supporting the rotor 10.

Figure 2:
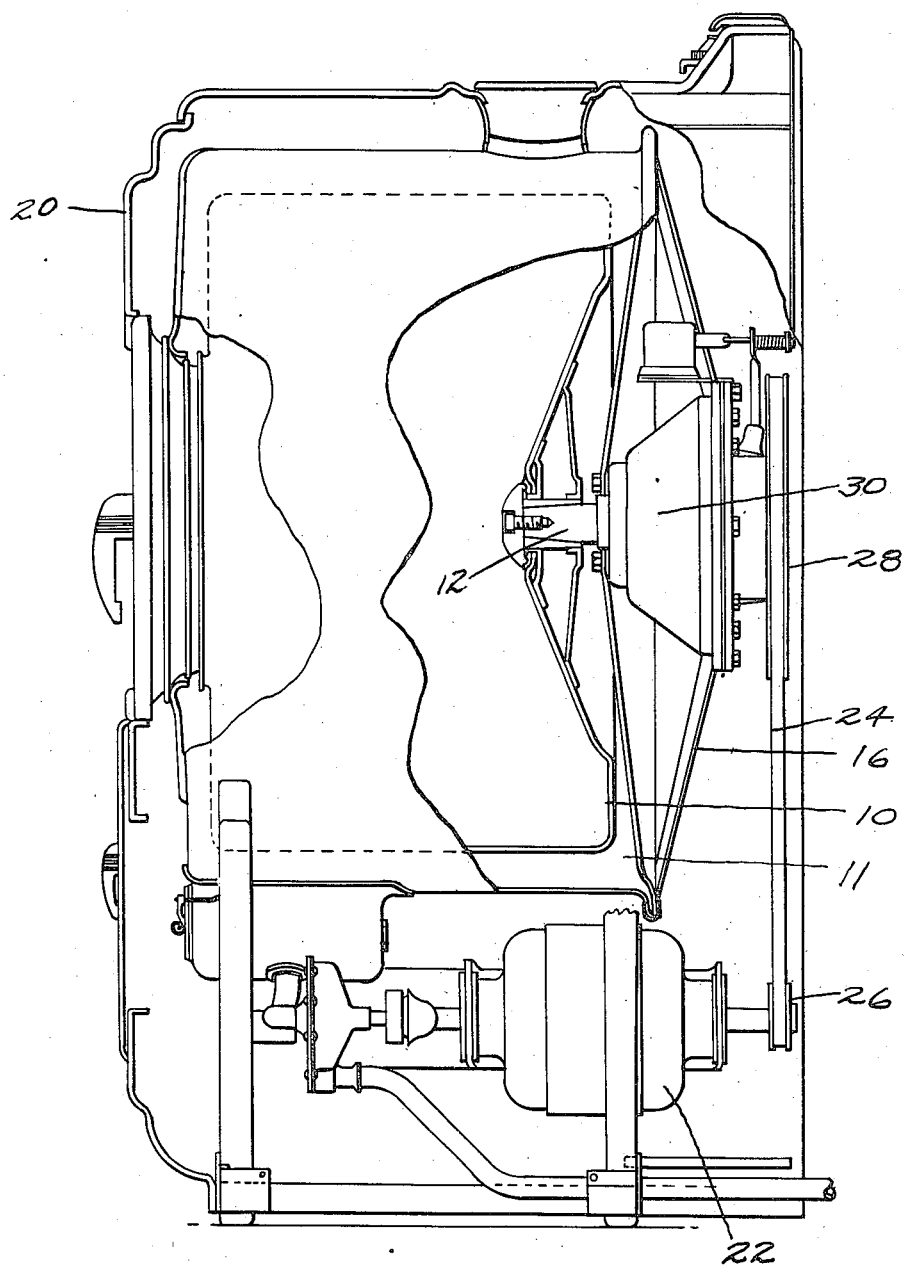
Figure 2 is a side view partly in section of a washing machine having the transmission in place and showing the general relation of the transmission to the other parts of the machine including the supported and rotated rotor and the tub on which the transmission is secured.
Figure 3:
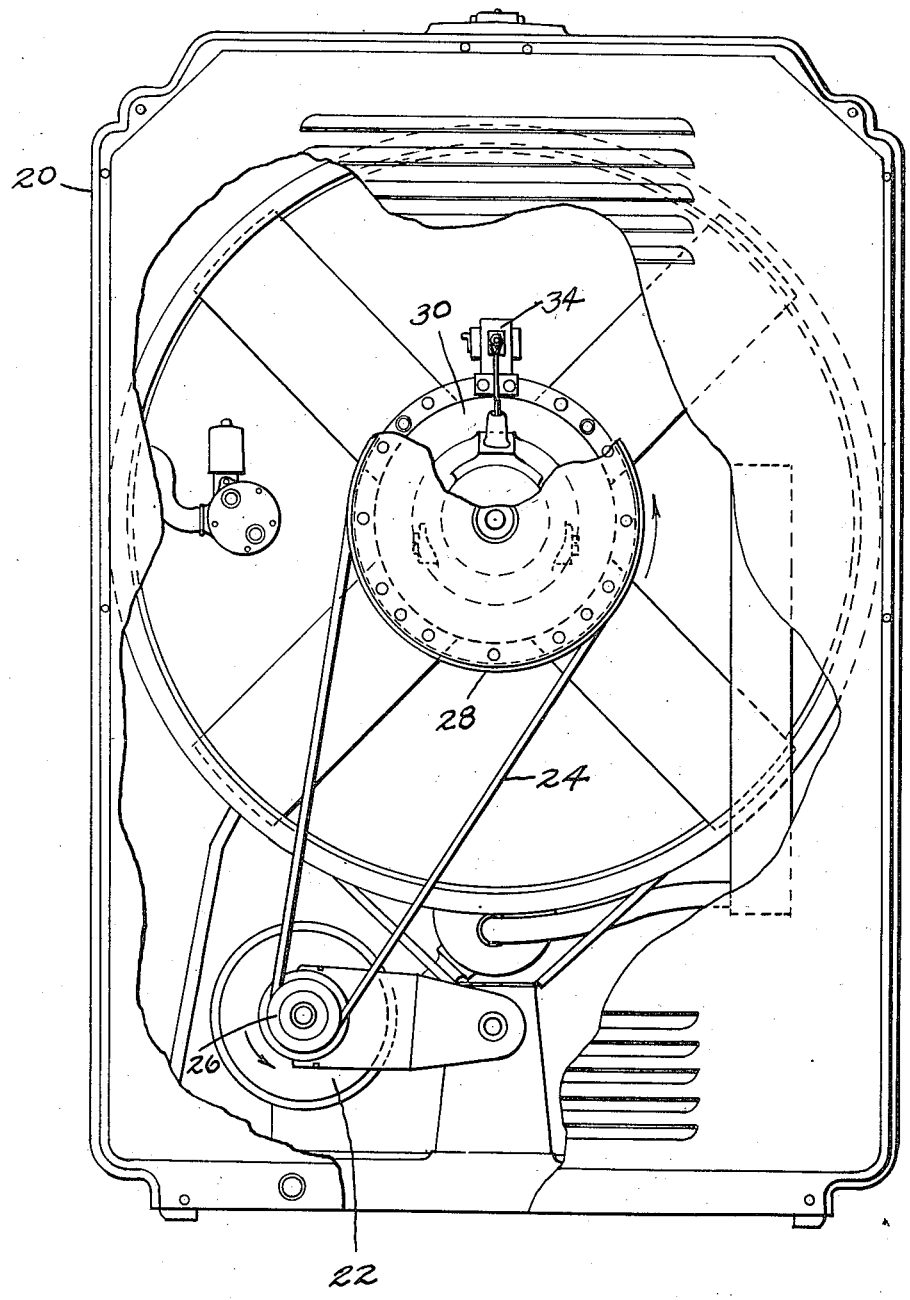
Figure 3 is a rear view of the washing machine with the transmission attached showing particularly the relation of the rotor drive to the transmission and further details of the means to operate the transmission clutch together with the support.

Figures 2 and 3 show a type of automatic washing machine with which this transmission is designed to be used and in general it conforms to the type of machine more completely described in Patent No. Re. 22,375 particularly as to the operation of the rotor 10 in washing, distributing and centrifuging the clothes. In that installation however the transmission is not located in the cone-back.

In addition to the previously mentioned rotor 10 and tub 11 shown on Figures 2 and 3, the machine comprises a cabinet 20, a driving motor 22, a belt 24, a driving pulley 26 and a driven pulley 28 which through the transmission assembly, denoted generally by the reference numeral 30, drives the shaft 12 and the rotor 10 either at a speed directly determined by the ratio of the pulleys 26 and 28 or at a lower speed through a gear reduction provided inside the transmission. (See Figure 1.) The specific construction of the transmission will be described later, but the selection of the two speeds is determined by the actuation or lack of actuation of a clutch 32 (Figure 1) which is actuated by a solenoid 34. The solenoid 34 is preferably controlled by suitable electrical contacts in a timer mechanism such as is disclosed in the previously mentioned Patent No. Re. 22,375. The timer also actuates the other parts of the automatic washing machine to carry out the required steps in proper sequence.

Proceeding with a description of the details of the transmission (Figure 1) the driven pulley 28 is secured to, and rotates with, a sleeve 36. The connection between the pulley and the sleeve may be accomplished in any conventional manner such as by a key 38. The previously mentioned shaft 12 has an outwardly extending portion 42 (Figure 1) which fits into a tapered bushing 44, the shaft end being keyed into place in the bushing 44, the said bushing being secured to the rotor 10 at its axis of rotation. The connection of the shaft 12 to the tapered bushing and the rotor is made more positive by screw-threaded member 48 which extends from inside the rotor into the end of the shaft 12, a suitable gasket 50 being provided between the member 48 and the interior of the rotor.

For the purpose of providing the necessary spaced supports for the shaft 12, the previously mentioned bearing 13 supports the shaft in the innermost position as shown in Figure 1 while the end portion 52 of the shaft extends inside a suitable bearing 54, which is preferably a needle roller bearing, and is positioned inside the sleeve 36 thereby allowing rotation of shaft 12 relative to sleeve 36. The sleeve 36 is itself supported by the outer main bearing 14 and also receives some support due to the fact that the shaft 12 is supported inside the sleeve 36. Said shaft 12 is also indirectly supported by the outer main bearing 14 through the sleeve 36 thus completing a dual spaced support for said shaft which is quite essential for the satisfactory cantilever support of a load such as the rotor 10.

The inner end of the sleeve 36 has gear teeth 54 cut thereon and this gear 54 forms the sun gear of a planetary gear train made up of planet gears 56 and orbit gear 58. The orbit gear 58 is in the form of an internal gear. The planet gears 56 are three in number and are carried on a planet gear carrier 60 which is keyed or otherwise secured to rotate with the shaft 12. The orbit gear 58 is carried by a member 62 which is secured to and rotates with a hub 64 which rotates around a projecting member 66 which is retained in place by the end plate 68 of the transmission housing. The end plate 68 is secured to the wall of the tub 11 by suitable means as shown and is also provided with sealing gaskets or other means to assure a satisfactory seal of the shaft 12 against a flow of liquid out from the tub or the leakage of lubricant into the tub. The orbit gear hub 64 is mounted to rotate on the projecting member 66 as a bearing and has a one-way connection 70 between the hub and the member 66. The one-way holding connection 70 assures that the orbit gear will be held against rotation when the force exerted by the planet gears 56 on the orbit gear 58 is in a direction opposite to the direction of rotation of the sun gear 54 on sleeve 36. However the one-way holding connection allows rotation of the orbit gear 58 when rotation imposed is in the same direction as that of sun gear 54. As shown in Figure 7 which is a detail of one-way holding connection 70, the orbit gear hub 64 may rotate in a counterclockwise direction but will be retained against rotation when the tendency of the orbit gear is to rotate in a clockwise direction. The one-way holding connection is preferably constructed as shown with members such as rollers 72 mounted in suitably shaped openings 74 so that the outer member of hub portion 64 will tend on rotation in one direction to tighten the rollers against the tapered edge of the opening thus producing a drive or on rotation in the opposite direction will cause the rollers to fall into the wider end of the opening thus allowing the member 64 to rotate freely.

The clutch 32 has an inner pressure plate 80 which is secured to the planet gear carrier 60 through the bearing supports for the planet gears as shown in Figure 1. The clutch 32 employs an outer clutch pressure plate 82 which is journaled upon sleeve 36 and is free to rotate relative thereto but is retained against rotation relative to the inner clutch pressure plate 80 by contact with projecting portions 84 of the inner plate 80 as shown in Figure 5. The outer plate 82 is thus mounted with axial freedom allowing it to slide axially relative to the sleeve 36 and is urged in sliding movement away from inner plate 80 by a series of springs 86 one of which can be seen in Figure 1 and all four of which are shown in Figure 5. Between the two clutch pressure plates 80 and 82 there is a clutch plate 88 which has a central member having internal gear teeth cut thereon of such configuration as to slide on the previously mentioned gear teeth 54 cut in the end of the sleeve 36. The length of the gear teeth 54 on the sleeve 36 is sufficient to act both as a sun gear near the end of the sleeve and farther, to the right, as viewed in Figure 1, to allow mounting of the clutch plate 88 for sliding movement relative to the sleeve 36 but to retain it for rotation relative to said sleeve. The clutch plate 88 is provided with suitable clutch facings on both sides thereof to contact the clutch pressure plates 80 and 82. For the purpose of sliding the clutch pressure plate 82 into engagement with the clutch plate 88 and clutch plate 88 against plate 80, a ring member 90 is mounted as shown in Figures 1 and 4. This mounting is accomplished by a pair of laterally extending pins 92 positioned on a lever 94 which lever is pivoted on the transmission housing as shown at 96 (Figure 4). Thus the tilting of the lever on the pivot 96 will cause the member 90 (Figures 1 and 4) with its felt facing to contact the pressure plate 82 for pressing the clutch into engagement. As shown in Figure 1 the solenoid 34 is connected to the lever 94 through connecting mechanism 98 which includes a spring 100 so that on actuation of the solenoid 84 the member 90 will be resiliently held into engagement thus also resiliently to support the clutch in its engaged position.

In the operation of the transmission the rotor 10 is supported and rotated on the projecting end 42 of the shaft 12 and, as will be noted on reference to Figure 1, the shaft is supported near its inner end on bearing 13 but has another projecting end which extends into the sleeve 36 and this sleeve is in turn supported by the bearing 14. The shaft, however, is of sufficient length so that it extends into the sleeve past the bearing 14 and is therefore in effect supported on both of the bearings for the purpose of giving an adjacent spaced support for the shaft suitable to provide sufficient rigidity for effectively supporting the rotor 10 during its rotation.

The pulley 28 of the transmission is driven counterclockwise as shown in the general view of Figure 3 from the motor 22 and there is a reduction in speed from the motor pulley to the larger transmission pulley 28. The selection of sizes in the two pulleys is such, relative to the motor speed, that the speed afforded by the normal operation of the motor will rotate the sleeve 36 at a speed satisfactory for centrifuging or in other words the highest speed desired in operation of the machine. However, assuming that it is first desired that a relatively slow washing speed of rotation will be produced at the output end 42 of the shaft 12, the solenoid 34 will not be actuated and clutch plates 80, 82 and 88 will be out of contact. As a result the sleeve 36 will rotate the sun gear 54 and the meshing planet gears 56, the direction of rotation of the planet gears 56 being such that the tendency of the orbit gear 58 will be to rotate in a counter-clockwise direction (opposite to the rotation of sun gear 54) as viewed in Figures 6 and 7 thus causing one-way drive connection to resist rotation and hold the orbit gear 58. Such action will require the planet gear carrier to move in a direction clockwise induced by the reaction of the planet gears on the orbit gear. This clockwise direction of rotation is imparted to the shaft 12 also since the planet gear carrier is secured to the shaft 12. The relative sizes of the gears is such as to give the desired gear reduction and speed of the shaft 12 for the washing operation which in the disclosure illustrated is approximately 60 R. P. M. However, when it is desired to have the shaft 12 rotate at the same speed as the sleeve 36 for centrifuging, the solenoid 34 is actuated. This movement pulls the lever 94 carrying the contacting member 90 against the pressure plate 82 thus gripping the clutch plate 88 between the pressure plates 80 and 82 and thereby causing the planet gear carrier 60 to be in effect locked to sleeve 36 and to rotate at the same speed as the sleeve 36. Since the planet gear carrier 60 is secured to the shaft 12, its rotation necessarily causes the shaft 12 to rotate at the same speed as the sleeve 36. In other words the entire gear assembly is locked by actuation of the clutch and the entire unit rotates around and with the shaft, all parts rotating at the same speed which is the speed imposed by the relative sizes of the pulleys 26 and 28. As previously mentioned, the one-way drive 70 will allow the orbit gear 58 and its supporting hub parts to rotate relative to the projecting member 66 of the casing when such rotation is in the same direction as the sleeve 36 and therefore such rotation is allowed when the parts are locked together for direct drive as above described.

Although the mechanism has been described by specific reference to a structure found practical for actual use, it is intended the mechanical equivalents may be substituted and variations made without departing from the fundamental principles herein disclosed and within the scope of the following claims.

We claim:

1. A transmission and support assembly comprising, a housing, a shaft having an end extending from said housing and serving as a load support and output connection, a sleeve extending over a portion of said shaft at its opposite end and extending out from said housing to form an input drive connection, a gear train for connecting said sleeve to said shaft thereby affording a gear reduction between said sleeve and shaft, gear teeth cut on said sleeve for driving said gear train, a clutch for selectively connecting said shaft and sleeve directly, and an element of said clutch retained for rotation with said sleeve by contact with said gear teeth but slidable axially of said sleeve on said gear teeth.

2. In a transmission, a shaft mounted to support a load on a projecting end thereof, a planetary gear train concentric with said shaft comprising, an input drive sleeve surrounding an end of said shaft and having teeth forming a sun gear of said planetary gear train, an orbit gear also concentric with said shaft, planet gears between said sun gear and said orbit gear, a planet gear carrier connected to rotate with said shaft, a one-way holding connection between said orbit gear and said housing holding said orbit gear from rotation in one direction and allowing rotation in the opposite direction, a clutch element slidable upon said sleeve but forced to rotate therewith by contact with the teeth of said sun gear, another clutch element rotatable with said shaft, and means for causing said clutch elements to grip each other to cause said shaft and sleeve to rotate together thereby locking said planetary gear train to rotate with said shaft and sleeve.

3. In a transmission and support assembly, a housing, a shaft mounted for rotation in said housing and having a projecting end thereof adaptable to support a load, an input drive sleeve extending into said housing and surrounding an end of said shaft, a planetary gear train, an element of said gear train connected to rotate with said shaft, gear teeth cut in the end of said sleeve and forming a sun gear of said planetary gear train thereby connecting said sleeve with said shaft through said gear train, a clutch part retained to rotate with said sleeve by contact with said gear teeth and operable by sliding movement on said gear teeth to lock said planetary gear train to cause said sleeve to rotate with said shaft for direct drive.

4. A transmission and support assembly adapted to act as a support for a load and to rotate said supported load comprising, a housing, a pair of spaced bearings supported in said housing, an input drive sleeve mounted for rotation in one of said bearings, a shaft mounted for rotation in the other of said bearings and having an end thereof extending into said sleeve for rotation and support therein, a gear train for connecting said sleeve with said shaft comprising a sun gear concentric with said sleeve and rotatable therewith, an orbit gear also concentric with said sleeve but of substantially larger diameter, planet gears between and meshing with said sun gear and said orbit gear, a planet gear carrier carrying said planet gears, means securing said carrier to said shaft, a one-way holding connection allowing movement of said orbit gear only in one direction of rotation relative to said housing but restraining movement in the opposite direction of rotation, and a clutch connecting said planet gear carrier with said sleeve whereby said orbit gear, said planet gear carrier, and said shaft and said sleeve will rotate together on actuation of said clutch but when said clutch is not actuated the gear reduction afforded by said planetary gear train will afford a gear reduction between said shaft and sleeve.

5. In a transmission and support assembly, a housing, a shaft supported in said housing and adapted to carry a load on a projecting end thereof, an input drive sleeve projecting into said housing and surrounding an end of said shaft, a gear train between said input drive sleeve and said shaft, a clutch part secured to rotate with said sleeve and to slide on said sleeve, a second clutch part secured to rotate with said shaft, clutch operating means mounted to slide on said sleeve for connecting said clutch parts for a direct drive from said sleeve to said shaft.

MYRON W. BOWEN.
EVERETT R. BURTNETT.